UNITED STATES PATENT OFFICE.

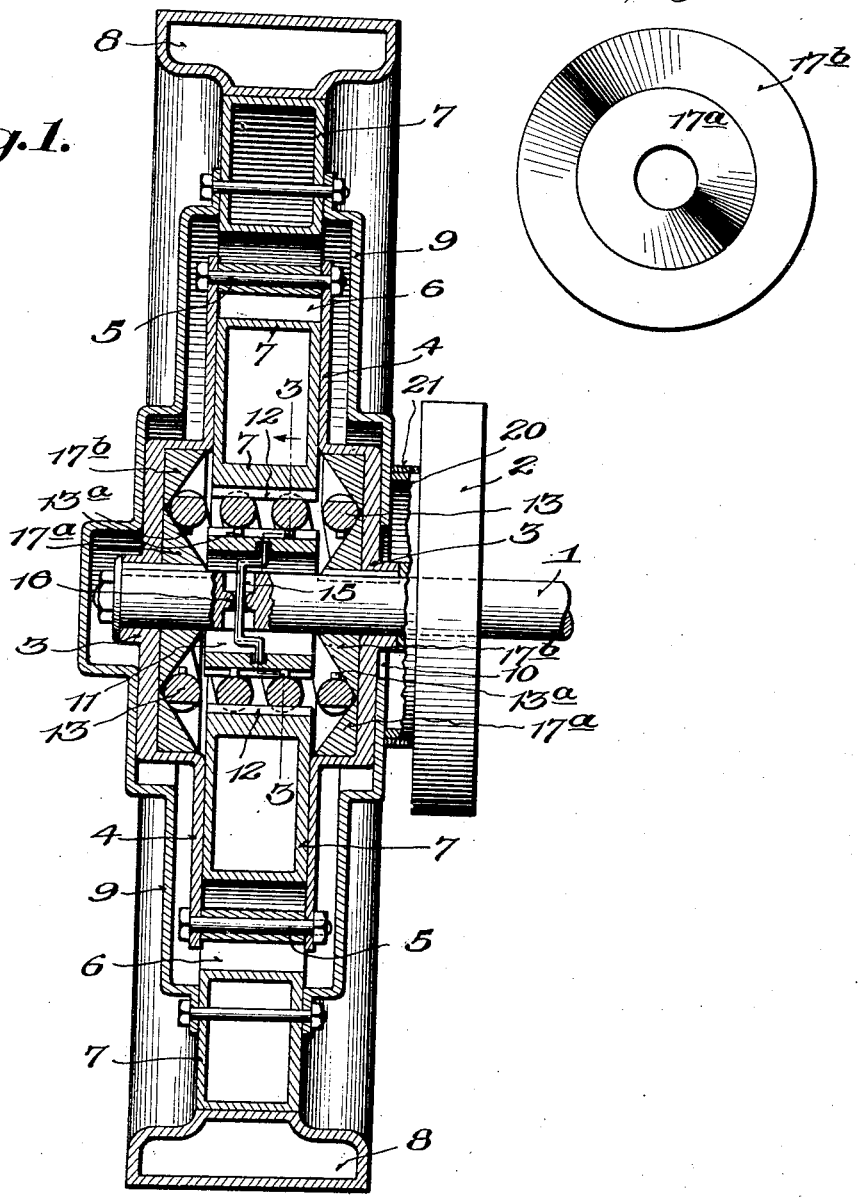
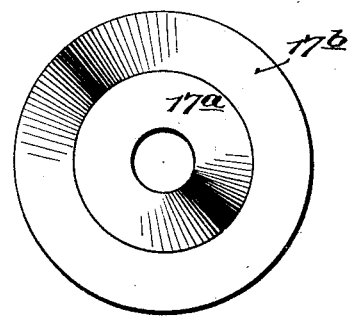

BENJAMIN F. SEYMOUR, OF WASHINGTON, DISTRICT OF COLUMBIA.

VEHICLE WHEEL.

1,409,977.  Specification of Letters Patent.  Patented Mar. 21, 1922.

Application filed January 3, 1919. Serial No. 269,481.

*To all whom it may concern:*

Be it known that I, BENJAMIN F. SEYMOUR, a citizen of the United States, residing at Washington, in the District of Columbia, have invented new and useful Improvements in Vehicle Wheels, of which the following is a specification.

The present invention relates to improvements in vehicle wheels of the type or character which include an internal shock absorber whereby a strong and durable structure employing solid tires will be given the resiliency commonly found only where pneumatic tires are employed.

In the accompanying drawings:

Figure 1 is a sectional view through a wheel constructed in accordance with the present invention.

Figure 2 is a detail view of one of the spring abutments.

Figure 3:
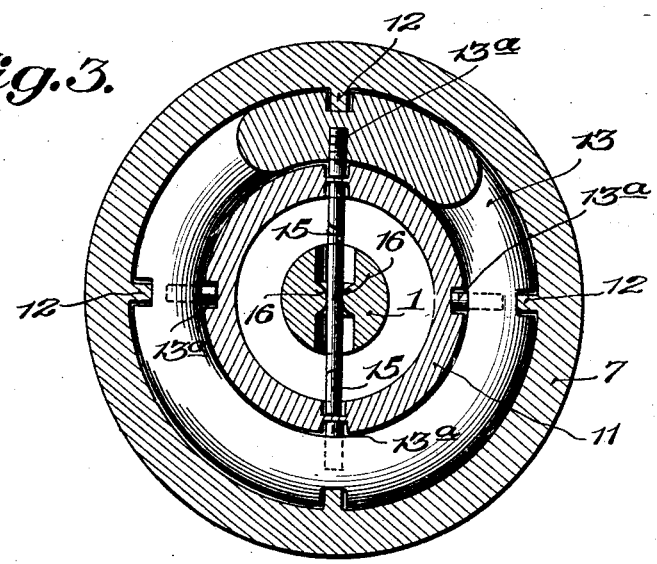
Figure 3 is a sectional view on the line 3—3 of Figure 1, on an enlarged scale.

In the embodiment of the invention illustrated, the wheel is mounted on a driving axle 1 to which is secured a brake drum 2. The wheel comprises two main members, the one having a hub 3 which is shown as keyed to the axle 1, although the parts may be connected in any other manner which will permit them to turn together. The hub 3 is formed by the inner end of suitable disks 4 which are connected by bolts 5 that extend through slots 6 formed in the body 7 of the other wheel member. This body 7 is provided with a peripheral tire section 8 to which are secured side plates or disks 9, the inner one of which is provided with an opening 10 through which the axle 1 and hub 3 of the other wheel member extend. The outer disk member 9 of the wheel is shaped to provide a cap-like cover that extends across the outer end of the axle, said cap being spaced from the hub member 3 so that the relative movement between the wheel members hereinafter referred to will not be interfered with.

Within the body member 7 is arranged a sleeve 11, between which and the hub portion of the member 7 is positioned a coiled spring 13. As shown the spring is interlocked with the member 7 and sleeve 11, so that while all of said parts will rotate together the spring is free to move axially relative to the wheel member and sleeve. As shown the portion of the wheel member surrounding the spring is provided with a plurality of inwardly extending ribs 12 which engage suitable ways or grooves formed in the peripheral surface of the convolutions of the spring and on the surfaces of the spring coils are provided projections 13$^a$ which extend into grooves formed in the inner sleeve 11.

Means are provided for transmitting movement from the axle 1 to the inner sleeve 11 said means, in the embodiment of the invention illustrated, comprising a bent rod or shaft 15 that extends through the axle 1 and has its ends extending into sockets formed in the inner surface of the sleeve 11. The passage through the axle is made of slightly greater diameter than the rod or shaft and in said passage are provided fulcrum surfaces 16 that fit somewhat closely about the rod but do not interfere with some lateral movement thereof. The sockets in the sleeve 11 that receive the ends of the rod are also of greater diameter than the rod so that the latter may have a slight movement therein. By this connection a substantially universal joint is provided between the axle and sleeve 11.

Figure 4:
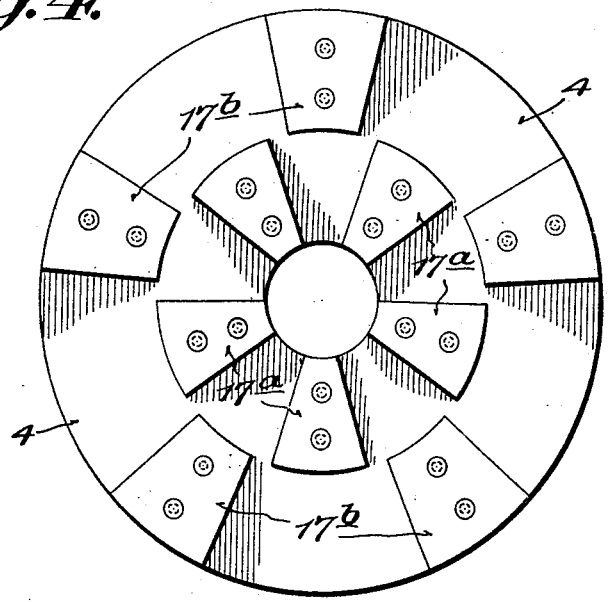
Figure 4 is a face view of one of the sets of wedges or cams, showing a slightly modified form from that of Figure 2.

It will be seen that the spring 13 is bodily movable with one of the wheel members and means are provided whereby during any relative radial movement between the two wheel members, a compressive force will be exerted simultaneously on both ends of said spring. As shown each of the disks 4 is provided on its inner face with two series of cam surfaces, shown as formed by oppositely inclined wedge-shaped members 17$^a$—17$^b$. As shown in Figures 1 and 2 the cam surfaces 17$^a$—17$^b$ extend continuously around the hub of the wheel but if it is desired to reduce the weight said surfaces may be of the nature shown in Figure 4 being produced by a plurality of separated blocks or members which are connected to the wheel disks by bolts or other suitable fastening means.

It will be seen that by the construction thus described the cam surfaces 17$^a$—17$^b$ are firmly secured to the axle and held from movement relative thereto whereas the spring 13 is bodily movable with the wheel member by which it is carried. Therefore when any relative movement between the two wheel members occurs the cam surfaces will exert a compressive action upon both ends of the spring and thus effectually cushion any shock or blow that may be experienced by the wheel in passing over rough or uneven surfaces.

As shown the brake drum 2 is provided with an annular ring-like flange 20 that bridges the space between it and the outer wheel member, and in order to effectually prevent the entrance of dust or dirt to said casing this flange is preferably surrounded by a ring of suitable fabric 21.

While as hereinbefore described and as shown in the accompanying drawing the invention is particularly designed for use in a vehicle wheel, it will be appreciated that many of the features thereof may be employed in other structures and the term wheel as employed in the claims hereof is to be understood as including any structure which is liable to be subjected to blows or pressure in a predetermined direction.

Having thus described the invention what is claimed is:

1. A wheel comprising two casing members arranged one within the other, and adapted to have a relative radial movement as regards their common axis, the inner member being provided on the inner face of each side wall with cam surfaces, a coiled spring arranged coaxially with the casing members with its ends abutting said cam surfaces, and means connected to the outer casing member, extending into the inner member and engaging the spring, whereby the latter will be bodily moved in a radial direction with said outer member.

2. A wheel comprising an exterior casing member including a ring-like body 7, and side plates 9, an interior member having its sides positioned between the plates 9 and body 7 of the exterior member, means connecting the sides of the inner member and extending through slots in the body of the outer member, whereby the two members are capable of relative radial movement as regards their common axis, co-operable pairs of opposed cam surfaces on the inner faces of the sides of the inner member, and a coiled spring arranged coaxially with said members within the central member of the body 7, and having its ends abutting said cam surfaces on the inner member.

3. The combination of a wheel comprising a member having a hub including two concentric sleeves, a coiled spring arranged between said sleeves and connected to rotate therewith while free to move axially thereof, and a second wheel member movable radially relative to the first said member and having on its interior cam surfaces bearing against the ends of the spring, for the purpose described.

4. The combination of a wheel comprising two concentric members, a coiled spring arranged coaxial of and connected to the hub member by interengaging projections and grooves, whereby the spring is free to move axially of the hub while rotating therewith, and cams on the outer wheel member bearing against the ends of the spring, for the purpose described.

5. A wheel comprising two members assembled to permit of relative radial movement therebeween, co-operable pairs of opposed cam elements associated with one of said members, a spring co-operable with said cam elements and resiliently supporting the other of said members, a driving element, and a driving connection between said driving element and said spring, substantially as set forth.

6. A wheel comprising two members assembled to permit of relative radial movement therebetween, oppositely disposed cam elements carried by one of said members, a laterally compressible spring interposed between said cam elements, and resiliently supporting the other of said members, a driving axle, and a driving connection between the driving axle and said spring, substantially as set forth.

7. A wheel comprising two members assembled to permit of relative radial movement therebetween, oppositely disposed cam elements carried by one of said members, a laterally compressible spring interposed between said cam elements and resiliently supporting the other of said members and having driving connection therewith, a driving axle, a sleeve interposed between the axle and said spring, and positive driving connections between the axle, the sleeve, and said spring, substantially as set forth.

In testimony whereof I have hereunto set my hand.

BENJAMIN F. SEYMOUR.